United States Patent
Goldschmidt Iki et al.

(10) Patent No.: US 6,184,918 B1
(45) Date of Patent: Feb. 6, 2001

(54) METHOD AND APPARATUS FOR MONITORING VIEWING OF BROADCAST DATA

(75) Inventors: Jean M. Goldschmidt Iki, San Jose; Anthony Alexander Shah-Nazaroff, Santa Clara; Christopher D. Williams, Soquel; Kathleen Lane, Los Altos, all of CA (US)

(73) Assignee: Intel Corporation, Santa Clara, CA (US)

(*) Notice: Under 35 U.S.C. 154(b), the term of this patent shall be extended for 0 days.

(21) Appl. No.: 08/939,810

(22) Filed: Sep. 30, 1997

(51) Int. Cl.[7] ............... H04N 7/00; H04N 7/10; H04H 1/00; H04H 1/02
(52) U.S. Cl. .............. 348/1; 348/10; 348/7; 348/12; 455/6.1; 455/6.2; 455/5.1; 455/4.2
(58) Field of Search .............. 348/1, 4, 5, 10, 348/907, 7, 12, 13; 455/2, 6.2, 6.3, 5.1, 6.1, 4.2

(56) References Cited

U.S. PATENT DOCUMENTS

| 4,230,990 | * | 10/1980 | Lert, Jr. et al. | 455/67 |
| 4,639,779 | * | 1/1987 | Greenberg | 358/142 |
| 4,967,273 | * | 10/1990 | Greenberg | 358/142 |
| 5,450,122 | * | 9/1995 | Keene | 348/1 |
| 5,646,675 | * | 7/1997 | Copriviza et al. | 348/1 |

\* cited by examiner

Primary Examiner—John K. Peng
Assistant Examiner—Paulos Natnael
(74) Attorney, Agent, or Firm—Blakely, Sokoloff, Taylor & Zafman LLP

(57) ABSTRACT

A method for monitoring viewing of broadcast data includes detecting a lead tag corresponding to a program in the broadcast data. The broadcast data is monitored for a tail tag corresponding to the program. Whether the program was viewed in its entirety is determined by matching the lead tag with the tail tag.

18 Claims, 3 Drawing Sheets

METHOD AND APPARATUS FOR MONITORING VIEWING OF BROADCAST DATA

FIELD OF THE INVENTION

The present invention relates to the field of entertainment systems. More specifically, the present invention relates to a method and apparatus for monitoring the viewing of broadcast data on an entertainment system.

BACKGROUND OF THE INVENTION

Television has become the key element in the advertising program for many companies. Billions of dollars are invested in communicating a product message to the viewing audience. Advertisers who spend such huge sums of money understandably want to determine whether their money is being well spent and, if not, how improvements can be made. Feedback to assess whether an advertising campaign is working is desired. Information such as was a targeted portion of the public exposed to the campaign as planned and did the public find the advertisement favorable is valuable to the advertisers.

Various techniques are currently available to provide information of this nature. However, each of these suffers from various drawbacks. One of the earliest techniques involved conducting interviews with television viewers to determine their exposure to a particular advertisement and whether they had a favorable impression of the advertisement. This approach, however, required finding television viewers willing to participate in sometimes long surveys at inconvenient times. In addition, results obtained with this technique were suspect because of the heavy reliance on memory, and on the viewer's inclination to be biased in favor of what is of interest to the interviewer. Current audience measurement systems eliminate the need for participating in surveys at inconvenient times and the element of bias, but require participating households to have their television sets and video playback devices to be disassembled and hard-wired with viewing monitoring circuitry.

SUMMARY

A method for monitoring viewing of broadcast data according to an embodiment of the present invention is disclosed. A lead tag corresponding to a program in the broadcast data is detected. The broadcast data is monitored for a tail tag corresponding to the program. Whether the program was viewed in its entirety is determined by matching the lead tag with the tail tag.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
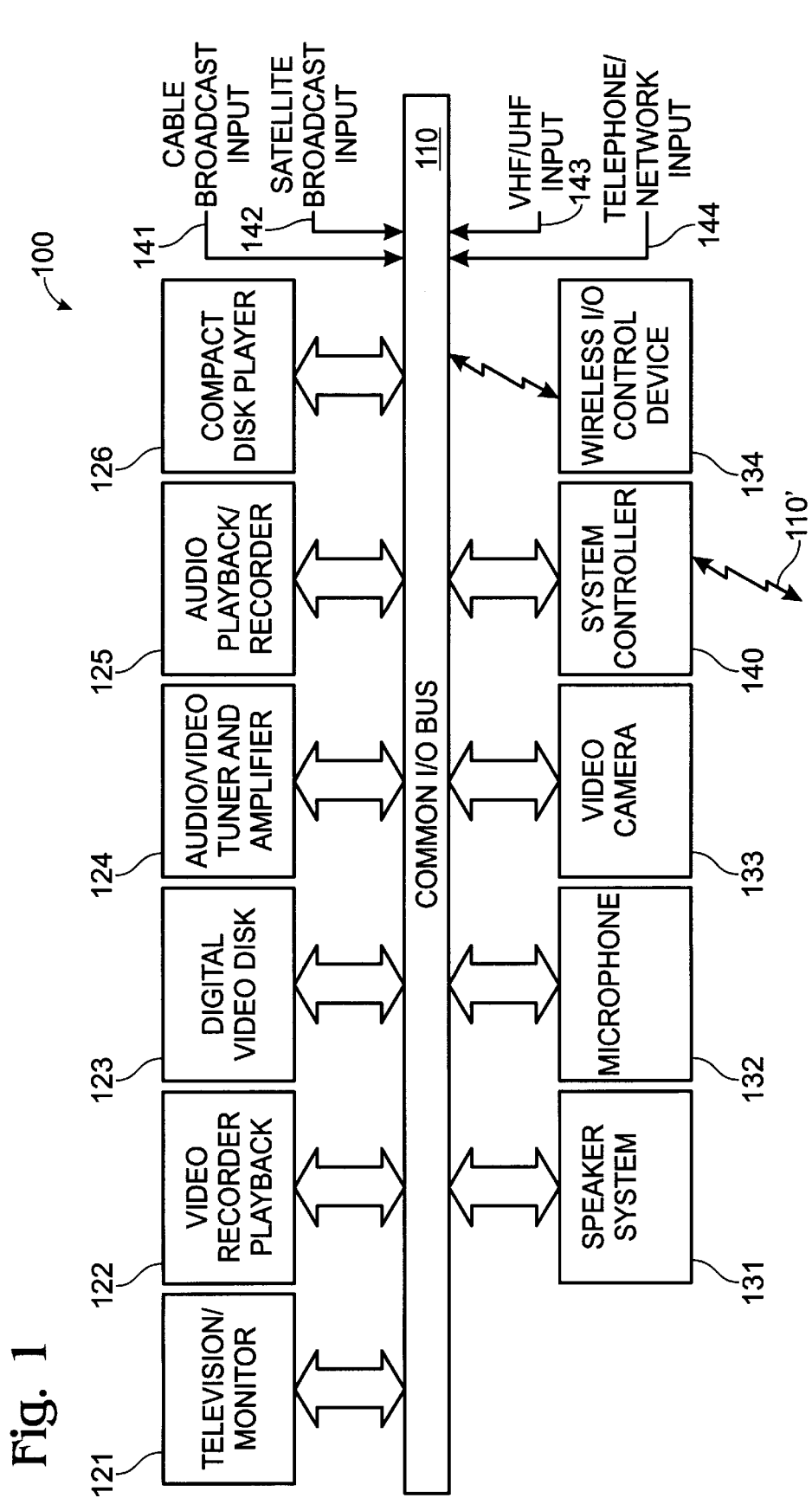
FIG. 1 is a block diagram illustrating the system components of one embodiment of an entertainment system according to the present invention.

FIG. 1 is a block diagram illustrating system components of an entertainment system 100 according to one embodiment of the present invention. The entertainment system includes a common input/output (I/O) bus 110 that connects the system components in the entertainment system 100 together. It should be appreciated that the common I/O bus 110 is illustrated to simplify the routing of signals between the computer system components. The common I/O bus 110 may represent a plurality of known mechanisms and techniques for routing I/O signals between the computer system components. For example, the common I/O bus 110 may include an appropriate number of independent audio "patch" cables that route audio signals, coaxial cables that route video signals, two-wire serial lines or infrared or radio frequency transceivers that route control signals, or other routing mechanisms that rout other signals.

In the illustrated embodiment, the entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the entertainment system 100 includes a speaker system 131, microphone 132, video camera 133, and a wireless I/O control device 134. In one embodiment, wireless I/O control device 134 is an entertainment system remote control unit which communicates with the components of the entertainment system 100 through IR signals. In another embodiment, wireless I/O control device 134 may be a wireless keyboard and cursor positioning device that communicates with the components of entertainment system 100 through IR signals or RF signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 100 also includes a system controller 140. According to one embodiment of the present invention, the system controller 140 operates to monitor the viewing of broadcast data on a television/monitor 121 on the entertainment system 100. The system controller 140 generates viewing data that may include the name of the program viewed and whether the program was viewed in its entirety. A program may be defined as a television program or a television commercial. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the entertainment system components of the entertainment system 100, although it is understood that each of the components may be individually controlled with wireless I/O control device 134.

As illustrated in FIG. 1, system 100 may be configured to receive broadcast data from a wide variety of entertainment system data sources. In one embodiment, entertainment system 100 receives broadcast data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), or other broadcast data sources. Further, it will be appreciated by one skilled in the art, that cable broadcast input 141, satellite broadcast input 142 and VHF/UHF input 143 may receive input from digital broadcast programming and digital cable programming. The broadcast data may be received by the entertainment system 100 via the audio/video tuner and amplifier 124, the system controller 140, or other system components or combination of system components.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
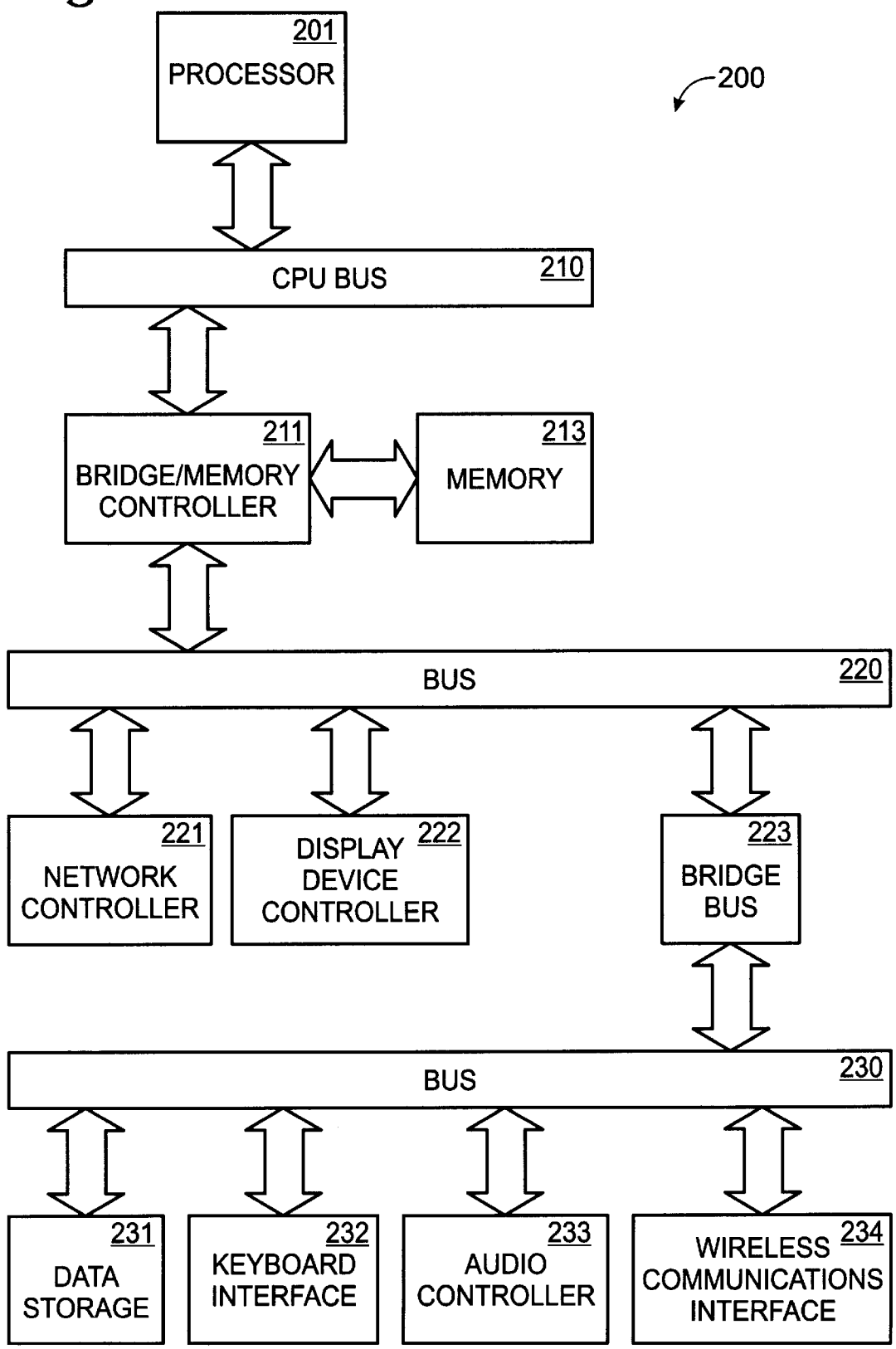
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201.

A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 links the computer system 200 to a network of computers and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card, a video card that includes a video tuner and amplifier, or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. A data storage device 231 may be a hard disk drive, a floppy disk drive, a CD-ROM device, a flash memory device or other mass storage device. An audio controller 233 operates to coordinate the recording and playing of sounds is also coupled to the I/O bus 230. A wireless communications interface 234 may be an IR transceiver or a RF transceiver for transmitting and receiving signals between system components of the entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, monitoring viewing of broadcast data is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to monitor viewing of broadcast data, as will be described hereafter. In alternative embodiments, hard-wire circuitry may be used in place of or in combination with software instructions to implement the present invention. Thus, the present invention is not limited to any specific combination of hardware circuitry and software.

Figure 3:
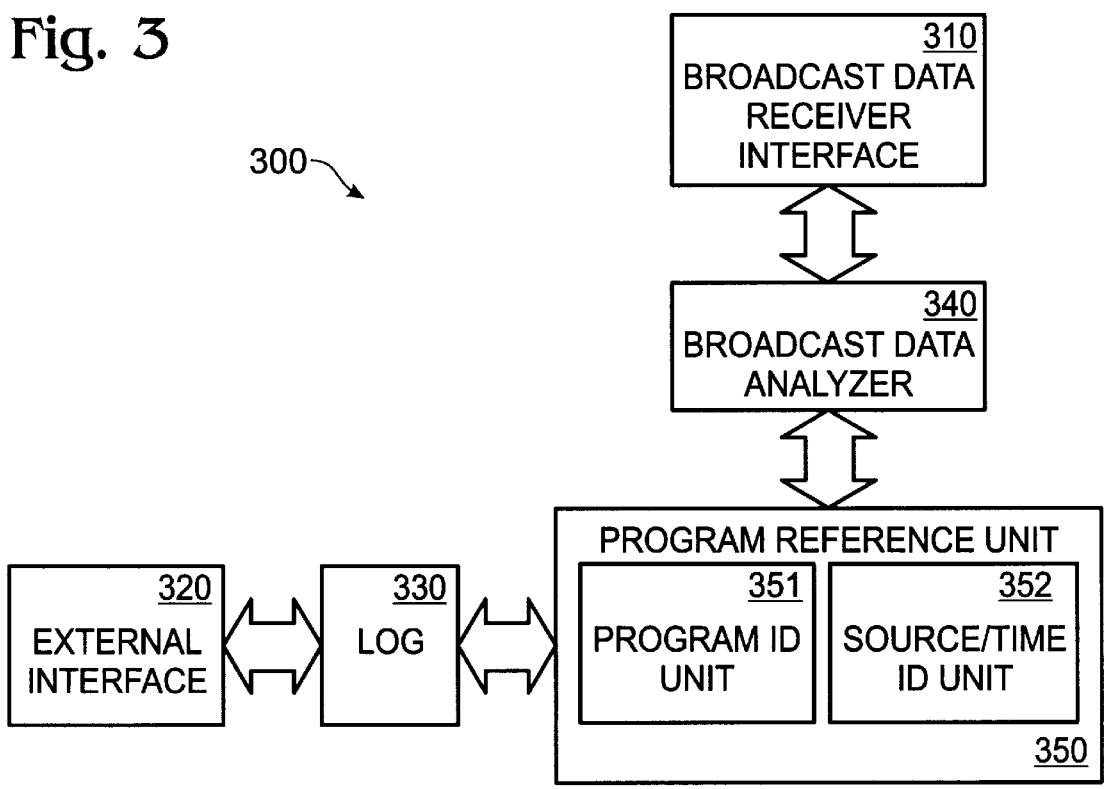
FIG. 3 is a block diagram of modules implementing an embodiment of the present invention.

FIG. 3 is a block diagram illustrating an embodiment of modules of a broadcast data monitor 300, according to the present invention. The modules may be implemented by software, hardware, or a combination of both hardware and software. The broadcast data monitor 300 includes a broadcast data receiver interface 310. The broadcast data receiver interface 310 operates to connect the broadcast data monitor 300 to a broadcast data receiver and to access broadcast data from a plurality of sources including analog and digital broadcast data such as cable broadcast input, satellite broadcast input, and VHF/UHF input. The broadcast data receiver interface 310 thus receives the broadcast data that is being viewed by the user of the entertainment system 100 (shown in FIG. 1). The broadcast data receiver interface 310 may be coupled directly or indirectly to the audio/video tuner and amplifier 124 (shown in FIG. 1), a display device controller 222 that includes a video card with a tuner and amplifier (shown in FIG. 2), or other circuitry to receive broadcast data.

A broadcast data analyzer 340 is coupled to the broadcast data receiver 310 and receives the broadcast data from the broadcast data receiver 310. According to an embodiment of the present invention, the broadcast data analyzer 340 monitors the broadcast data for program identification tags in the broadcast data. According to one embodiment of the present invention, a program identification tag is a message encoded in the vertical blanking interval (VBI) of analog broadcast data. According to a second embodiment of the present invention, a program identification tag is a message encoded in a program in digital broadcast data. The encoded message may be graphical, text, or other format and may include a name of a program, a code that corresponds to a name of a program, or other information corresponding to the program. The broadcast data analyzer 340 may include a VBI analyzer and a digital broadcast analyzer to monitor the broadcast data for the program identification tags.

More than one program identification tag may be encoded in a program. For example, a "lead tag" may be encoded in the beginning of a program that identifies the beginning of a program and a "tail tag" may be encoded at the end of a program to identify the end of a program. Upon detecting a lead tag and a matching tail tag of a first program without detecting a tag that corresponds to a second program in between the lead tag and tail tag of the first program, the broadcast data analyzer 340 recognizes that a user of the entertainment system 100 has viewed the first program in its entirety. Upon detecting a lead tag of a first program and a tag corresponding to a second program after the lead tag of the first program, the broadcast data analyzer 340 recognizes that a user of the entertainment system 100 viewed the beginning of the first program, but did not view the end of the first program. In an embodiment of the present invention where "intermediate" program identification tags are encoded between a lead tag and a tail tag throughout a program, the broadcast data analyzer 340 would be able to determine the segment of the program where the user of the entertainment system 100 stopped viewing the program to the increment of time where the intermediate tags are encoded. Information regarding whether a program identification tag is lead tag, a tail tag, or an intermediate tag, and whether the program identification tag corresponds to a first program or a second program may be obtained by the broadcast data analyzer 340 at the program reference unit 350. According to an alternate embodiment of the present invention, the tags are self-identifying.

According to an embodiment of the present invention, the broadcast data analyzer 340 also monitors the audio signal as adjusted by the user of the entertainment system and recognizes when volume in a program has been adjusted. For example, the broadcast data analyzer 340 recognizes when volume in a program has been lowered, muted, or increased.

A program reference unit 350 is coupled to the broadcast data analyzer 340. The program reference unit 350 includes a program identification unit 351 and a source/time identification unit 352. The program identification unit 351 includes a table of codes that may be found to be encoded in the VBI of a program in analog broadcast data or in a program in digital broadcast data. Each of the codes has a corresponding program name and may include information as to whether the code corresponds to a lead tag, a tail tag, or an intermediate tag. The source/time identification unit 352 identifies the time and date broadcast data is viewed and a broadcast data source (channel) of the broadcast data. The program reference unit 350 receives the program identification tags detected by the broadcast data analyzer 340 and generates viewing data based on the program identification tags received. According to an embodiment of the present invention, the viewing data may include a name of the program that was viewed and whether the program was viewed in its entirety. The viewing data may also include information relating to whether the volume level of the program was adjusted during its viewing, the time the program was viewed, the broadcast data source of the program, and when during the program did the user of the entertainment system stop viewing the program if the program was not viewed in its entirety.

A log 330 is coupled to the program reference unit 350. The log 330 operates to store viewing data generated by the program reference unit 350. According to an embodiment of the present invention, the log 330 also operates to store user data relating to the user of the entertainment system 100. The user data may include personal data such as the age, sex, location, income, interests and other information about the user. The user data may also include viewing preferences of the user.

An external interface 320 is coupled to the log 330. The external interface operates to transmit the viewing data and the user data to a remote computer system. According to an embodiment of the present invention, the external interface 320 may transmit the viewing data and the user data through a network via the network controller 221 or other communication medium. According to an embodiment of the present invention, the viewing data and the user data from a plurality of entertainment systems may be transmitted to the remote computer system where the information is processed and a report is generated that includes data describing the number of viewers that watch a television program or a television commercial, whether the viewers watched the entire program, and demographics about the viewers.

It should be appreciated that the broadcast data receiver interface 310, the external interface 320, the log 330, the broadcast data analyzer 340, the program reference unit 350, the program identification unit 351, and the source/time identification unit 352 may be implemented by any known circuitry or technique. It should be appreciated that FIG. 3 illustrates one embodiment of the components in the broadcast data monitor 300 and that the components may be coupled in other arrangements.

According to an alternate embodiment of the present invention, the program identification unit 351 is a database that includes the name of programs that are broadcasted from various broadcast data sources at various times and dates. The program reference unit 350 may use the program identification unit 351 to determine a name of a program that a viewer is viewing on the entertainment system 100 by referencing information in the program identification unit 351 with information in the source/time identification unit 352 regarding a time that a viewer is viewing broadcast data and a broadcast data source from where the broadcast data is transmitted from. The program reference unit 350 may also determine whether a program is viewed in its entirety. According to this embodiment of the present invention, the program identification unit 351 may generate viewing data without utilizing program identification tags received from the broadcast data analyzer 340. The viewing data may include a name of a program that was viewed, whether the program the program was viewed in its entirety, whether the volume of the program was adjusted, and the time and broadcast data source of the program.

Figure 4:
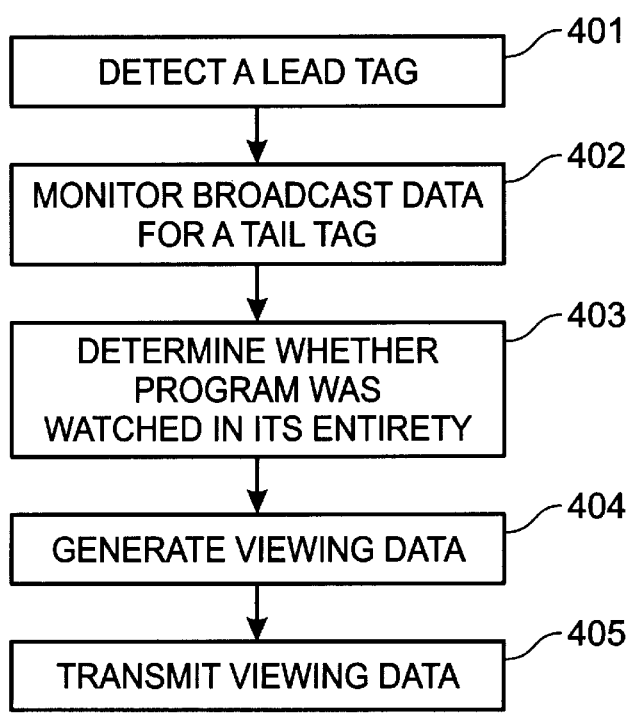
FIG. 4 is a flow chart illustrating a method for monitoring viewing of broadcast data according to an embodiment of the present invention.

FIG. 4 is a flow chart illustrating a method for monitoring viewing of broadcast data. According to an embodiment of the present invention, monitoring is performed in a system local to where the broadcast data is viewed. At step 401, a lead tag corresponding to a program in the broadcast data is detected. According to an embodiment of the present invention, the lead tag is a program identification tag that is encoded in the VBI in the program in the broadcast data. According to a second embodiment of the present invention, the lead tag is a program identification tag that is encoded in the program in the broadcast data.

At step 402, the broadcast data is monitored for a tail tag that corresponds to the program. According to a first embodiment of the present invention, the lead tag and the tail tag are identical. According to a second embodiment of the present invention, the lead tag and the tail tag are not identical and a tail tag is recognized by referencing information in a program reference unit.

At step 403, whether the program was viewed in its entirety is determined. According to an embodiment of the present invention, this is achieved by matching the lead tag of the program with a tail tag of the program without detecting a program identification tag corresponding to another program.

At step 404, viewing data relating to the viewing of the program is generated. According to an embodiment of the present invention, the viewing data may include the name of the program, whether the program was viewed in its entirety, the time when the program was viewed, the broadcast data source of the program, and whether the volume of the program was lowered. According to one embodiment of the present invention, the name of the program is obtained by matching the program identification tag of the program with information in a program identification unit. According to a second embodiment of the present invention, the time the program was viewed and the broadcast data source of the program is obtained from a source/time identification unit.

At step 405, the viewing data is transmitted to a remote computer system. The viewing data may be transmitted over the Internet, over a direct phone connection, or other communication medium.

In the foregoing specification, the invention has been described with references to specific embodiments thereof. It will however be evident that various modifications and changes may be made thereto without departing from the broader spirit and scope of the invention. The specification and drawings are, accordingly, to be regarded in an illustrative rather than restrictive sense.

What is claimed is:

1. A method for monitoring viewing of broadcast data, comprising:

detecting a lead tag corresponding to a program in the broadcast data;

monitoring the broadcast data for a tail tag corresponding to the program;

determining whether the program was viewed in its entirety by matching the lead tag with the tail tag; and generating viewing data relating to the viewing of the program;

wherein generating viewing data relating to the viewing of the program comprises recording whether volume of the program was adjusted.

2. The method of claim 1, wherein detecting the lead tag of the program in the broadcast data comprises reading a message encoded in the program.

3. The method of claim 1, wherein detecting the lead tag of the program in the broadcast data comprises reading a message encoded in a vertical blanking interval (VBI) of the broadcast data.

4. The method of claim 1, wherein generating viewing data relating to the viewing of the program comprises recording a name of the program.

5. The method of claim 1, wherein generating viewing data relating to the viewing of the program comprises recording whether the program was viewed in its entirety.

6. The method of claim 1, wherein generating viewing data relating to the viewing of the program comprises recording a time when the program was viewed.

7. The method of claim 1, wherein generating viewing data corresponding to the viewing of the program comprises recording a broadcast data source of the program;

recording a name of the program;

recording whether the program was viewed in its entirety; and recording a time when the program was viewed.

8. The method of claim 1, further comprising transmitting the viewing data to a remote computer system.

9. A computer-readable medium having stored thereon sequences of instructions, the sequences of instructions including instructions which, when executed by a processor, causes the processor to perform the steps of:

analyzing broadcast data to monitor said broadcast data for program identification tags corresponding to programs in the broadcast data;

generating, based on the analyzing, program viewing data that includes a name of a first program in the broadcast data and information regarding whether the first program was viewed in its entirety based on the program identification tags; and recording in a log the program viewing data from the generating.

10. The computer-readable medium of claim 9, wherein detecting the program identification tags in the broadcast data comprises reading a message signature encoded in the program.

11. The computer-readable medium of claim 9, wherein detecting the program identification tags in the broadcast data comprises reading a message encoded in a vertical blanking interval (VBI) of the broadcast data.

12. The computer-readable medium of claim 9, wherein generating viewing data relating to the viewing of the program comprises recording a name of the program.

13. The computer-readable medium of claim 9, wherein generating viewing data relating to the viewing of the program comprises recording whether the program was viewed in its entirety.

14. The computer-readable medium of claim 9, further comprising instructions which when executed by the processor causes the processor to perform the step of transmitting the viewing data to a remote computer system.

15. A broadcast data monitor, comprising:

a broadcast data analyzer that monitors broadcast data for program identification tags corresponding to programs in the broadcast data; and a program reference unit, coupled to the broadcast data analyzer, that generates a log of program viewing data that includes a name of a first program in the broadcast data and information regarding whether the first program was viewed in its entirety based on the program identification tags.

wherein generating viewing data relating to the viewing of the program comprises recording whether volume of the program was adjusted.

16. A broadcast data monitor, comprising:

a broadcast data analyzer that monitors broadcast data for program identification tags corresponding to programs in the broadcast data;

a program reference unit, coupled to the broadcast data analyzer, that generates program viewing data that includes a name of a first program in the broadcast data and information regarding whether the first program was viewed in its entirety based on the program identification tags; and a log, coupled to the program reference unit, that records the program viewing data generated by the program reference unit.

17. The broadcast data monitor of claim 16, further comprising an external interface, coupled to the log, that transmits the program viewing data to a remote computer system.

18. A broadcast data monitor, comprising:

a broadcast data analyzer that monitors broadcast data for program identification tags corresponding to programs in the broadcast data; and a program reference unit, coupled to the broadcast data analyzer, that generates program viewing data that includes a name of a first program in the broadcast data and information regarding whether the first program was viewed in its entirety based on the program identification tags;

wherein the program reference unit comprises a program identification unit that stores names of programs and identification tags corresponding to the programs, and a source/time reference unit that indicates the time when the first program was viewed and the broadcast data source of the first program.

* * * * *